Patented July 3, 1934

UNITED STATES PATENT OFFICE 1,965,139

VULCANIZATION OF RUBBER AND PRODUCT OBTAINED THEREBY

James H. Fentress, Norfolk, Va., assignor to The Rubber Service Laboratories Company, Akron, Ohio, a corporation of Ohio No Drawing. Application October 6, 1932, Serial No. 636,583

20 Claims. (Cl. 18—53)

The present invention is directed to the art of producing vulcanized rubber wherein a new class of compounds obtained as hereinafter described and possessing desirable characteristics for the use described is employed as an accelerator of the vulcanization process. The invention will be readily understood from the following specification wherein the novelty of the process is fully set forth and described.

The preferred new class of accelerators comprise the compounds produced by reacting mercaptoaryl thiazoles with compounds possessing the structural formula

where X is a halogen atom, R is one member of a group consisting of alkyl, aryl, and aralkyl radicals and substitutions thereof, and N is a component of a heterocyclic unsaturated ring. The reaction products indicated are rapid and strong accelerators.

For example the following substances are typical members of the class of materials outlined above: the reaction product of pyridine chlorobenzylate and the sodium salt of mercaptobenzothiazole, the reaction product of pyridine iodomethylate and the potassium salt of mercaptobenzothiazole, the reaction product of picoline chloromethylate and the sodium salt of mercaptobenzothiazole, the reaction product of picoline chloroethylate and the sodium salt of mercaptobenzothiazole, the reaction product of alpha picoline chlorobenzylate and the sodium salt of mercaptobenzothiazole, the reaction product of collidine iodomethylate and mercaptotolylthiazole, the reaction product of quinoline iodomethylate and the sodium salt of mercaptobenzothiazole, the reaction product of quinoline chlorobenzylate and the sodium salt of mercaptobenzothiazole, the reaction product of quinaldin iodopropylate and the sodium salt of mercaptobenzothiazole, the reaction product of quinaldine trichlorobenzylate, said quinaldine trichlorobenzylate being formed by treating quinaldine with benzotrichloride, and the sodium salt of mercaptobenzothiazole.

The following examples are specific embodiments of the present invention and not limitations thereof.

Example I

Substantially one-fourth of a molecular proportion of pyridine (19.7 parts) and substantially one-fourth a molecular proportion of benzyl chloride (31.6 parts) were heated together at substantially 100° C. under a reflux condenser. An oily dark red liquid resulted from the above treatment which on standing crystallized to form a soft red solid. The pyridine chlorobenzylate prepared in the manner described was then dissolved in a suitable organic solvent, for example substantially 225 parts by weight of ethyl alcohol, and substantially one-fourth a molecular proportion of the sodium salt of mercaptobenzothiazole (47.2 parts) dissolved in substantially 225 parts by weight of ethyl alcohol added thereto with agitation. After heating the above reactants for a desirable period of time, for example substantially one-half an hour on a steam bath, the sodium chloride precipitated was filtered off and the filtrate therefrom concentrated to substantially one-third its volume. To the concentrated solution substantially three volumes of water were added, whereupon the reaction product comprising a heavy red oil settled out, which after separation from the aqueous alcoholic layer, was incorporated in the usual manner in a rubber gum stock comprising 100 parts of pale crepe rubber,
5 parts of zinc oxide,
3 parts of sulfur,
1 part of stearic acid,
1 part of the reaction product of substantially equi-molecular proportions of pyridine chlorobenzylate and the sodium salt of mercaptobenzothiazole.

The rubber stock thus compounded was vulcanized in a press and on testing the cured rubber product was found to possess the following tensile and modulus characteristics.

Table I

| Cure | | Modulus of elasticity in lbs./in² at elongations of | | Tensile at break in lbs./in² | Ultimate elongation % |
|---|---|---|---|---|---|
| Time mins. | Lbs. steam pressure | 300% | 500% | | |
| 30 | 30 | 468 | 1720 | 4550 | 675 |
| 45 | 30 | 543 | 1800 | 4395 | 655 |

From the data set forth in Table I it is readily apparent that the preferred class of accelerators, for example the reaction product of substantially equi-molecular proportions of pyridine chlorobenzylate and the sodium salt of mercaptobenzothiazole comprise a group of valuable accelerators.

Example II

Alpha picoline chlorobenzylate prepared by heating substantially equi-molecular proportions of benzyl chloride and alpha picoline for substantially seven hours on a steam bath and comprising a thick dark colored oil was reacted with substantially an equi-molecular proportion of the sodium salt of mercaptobenzothiazole in a manner analogous to that given for Example I. The product thus formed comprising a dark green heavy oil was milled into a rubber stock comprising 100 parts of pale crepe rubber,
    5 parts of zinc oxide,
    3 parts of sulfur,
    1 part of stearic acid,
    1 part of the reaction product of substantially equi-molecular proportions of alpha picoline chlorobenzylate and the sodium salt of mercaptobenzothiazole.

The compounded rubber stock was vulcanized and the cured rubber product found to possess the tensile and modulus characteristics given in Table II.

*Table II*

| Cure | | Modulus of elasticity in lbs./in² at elongations of | | Tensile at break in lbs./in² | Ultimate elongation % |
|---|---|---|---|---|---|
| Time mins. | Lbs. steam pressure | 300% | 500% | | |
| 30 | 30 | 411 | 1295 | 4325 | 690 |
| 45 | 30 | 442 | 1355 | 4460 | 685 |

*Example III*

Quinoline chlorobenzylate was prepared by heating substantially equi-molecular proportions of quinoline and benzyl chloride for substantially two hours at substantially 100–130° C. After recrystallization from a solvent, as for example acetone, the purified product, comprising a solid melting at 143–146° C., was reacted with substantially an equi-molecular proportion of the sodium salt of mercaptobenzothiazole in a manner analogous to that given for Example I. The reaction product thus produced comprising a dark brown resin was incorporated in a rubber stock comprising 100 parts of pale crepe rubber,
    5 parts of zinc oxide,
    3 parts of sulfur,
    1 part of stearic acid,
    1 part of the reaction product of substantially equi-molecular proportions of quinoline chlorobenzylate and the sodium salt of mercaptobenzothiazole.

The rubber stock thus compounded was vulcanized and the cured rubber product tested. The test data thereof follow in Table III.

*Table III*

| Cure | | Modulus of elasticity in lbs./in² at elongations of— | | | Tensile at break in lbs./in² | Ultimate elongation % |
|---|---|---|---|---|---|---|
| Time mins. | Lbs. steam pressure | 300% | 500% | 700% | | |
| 30 | 30 | 481 | 1498 | 4760 | 5100 | 740 |
| 45 | 30 | 481 | 1450 | 4810 | 4810 | 700 |

The specific examples hereinbefore set forth all show the preferred new class of materials as being strong and rapid accelerators. The preferred and new class of accelerators may, if desirable, be employed in conjunction with a basic activating accelerator. Thus as a specific example thereof, the reaction product of substantially equi-molecular proportions of quinoline chlorobenzylate and the sodium salt of mercaptobenzothiazole was employed advantageously admixed with diphenyl guanidine in a typical gum stock.

*Example IV*

Quinaldine trichlorobenzylate was prepared by heating substantially equi-molecular proportions of quinaldine and benzotrichloride for substantially twelve hours at substantially 100° C. The product thus formed comprising a semi-crystalline mass was reacted with substantially an equi-molecular proportion of the sodium salt of mercaptobenzothiazole in a manner analogous to that given for Example I. After the elimination of any unreacted ingredients, the resulting reaction product comprising an oil was incorporated in a typical gum stock comprising 100 parts of pale crepe rubber,
    5 parts of zinc oxide,
    3 parts of sulfur,
    1 part of stearic acid,
    1 part of the reaction product of substantially equi-molecular proportions of quinaldine trichlorobenzylate and the sodium salt of mercaptobenzothiazole.

The resulting compounded stock was vulcanized and the cured rubber product tested. Tests obtained thereon showed that the reaction product of substantially equi-molecular proportions of quinaldine tricholorbenzylate and the sodium salt of mercaptobenzothiazole possessed accelerating properties typical of the class.

From the data hereinbefore set forth it is shown that the new and improved class of materials comprise an important group of rubber vulcanization accelerators.

Obviously, the practice of this invention is not limited to the specific compositions given above, such compositions being merely illustrative of methods of employing the accelerators of this invention. The present invention is limited solely by the appended claims wherein it is intended to claim the invention as broadly as possible in view of the prior art.

What is claimed is:

1. A process of treating rubber which comprises heating rubber and sulfur in the presence of an accelerator comprising a reaction product of a mercaptoarylthiazole and a compound possessing the structural formula of

where X is a halogen atom, R is one member of a group consisting of alkyl, aryl and aralkyl radicals and substitutions thereof and N is a component of a heterocyclic unsaturated ring.

2. A process of treating rubber which comprises heating rubber and sulfur in the presence of an accelerator comprising a reaction product of a mercaptoarylthiazole and a compound possessing the structural formula of

where X is a halogen atom, R is an aryl radical and N is a component of a heterocyclic unsaturated ring.

3. A process of treating rubber which comprises heating rubber and sulfur in the presence of an accelerator comprising a reaction product of a mercaptoarylthiazole and a compound possessing the structural formula of

where X is a halogen atom, R is an aryl radical and N is a component of a pyridine ring.

4. A process of treating rubber which comprises heating rubber and sulfur in the presence of an accelerator comprising a reaction product of an alkali salt of a mercaptoarylthiazole and a compound possessing the structural formula of

where X is a halogen atom, R is a benzyl radical and N is a component of a pyridine ring.

5. A process of treating rubber which comprises heating rubber and sulfur in the presence of an accelerator comprising a reaction product of a mercaptobenzothiazole and a compound possessing the structural formula of

where X is a halogen atom, R is a benzyl radical and N is a component of a pyridine ring.

6. A process of treating rubber which comprises heating rubber and sulfur in the presence of an accelerator comprising a reaction product of pyridine chlorobenzylate and a mercaptobenzothiazole.

7. A process of treating rubber which comprises heating rubber and sulfur in the presence of an accelerator comprising a reaction product of pyridine chlorobenzylate and an alkali salt of a mercaptobenzothiazole.

8. A process of treating rubber which comprises heating rubber and sulfur in the presence of an accelerator comprising a reaction product of quinoline chlorobenzylate and the sodium salt of mercaptobenzothiazole.

9. A process of treating rubber which comprises heating rubber and sulfur in the presence of an accelerator comprising a reaction product of substantially equi-molecular proportions of pyridine chlorobenzylate and the sodium salt of mercaptobenzothiazole.

10. A process of treating rubber which comprises heating rubber and sulfur in the presence of an accelerator comprising a reaction product of substantially equi-molecular proportions of quinoline chlorobenzylate and the sodium salt of mercaptobenzothiazole.

11. The vulcanized rubber product produced by heating rubber and sulfur in the presence of an accelerator comprising a reaction product of a mercaptoarylthiazole and a compound possessing the structural formula of

where X is a halogen atom, R is one member of a group consisting of alkyl, aryl and aralkyl radicals and substitutions thereof and N is a component of a heterocyclic unsaturated ring.

12. The vulcanized rubber product produced by heating rubber and sulfur in the presence of an accelerator comprising a reaction product of a mercaptoarylthiazole and a compound possessing the structural formula of

where X is a halogen atom, R is an aryl radical and N is a component of a heterocyclic unsaturated ring.

13. The vulcanized rubber product produced by heating rubber and sulfur in the presence of an accelerator comprising a reaction product of a mercaptoarylthiazole and a compound possessing the structural formula of

where X is a halogen atom, R is an aryl radical and N is a component of a pyridine ring.

14. The vulcanized rubber product produced by heating rubber and sulfur in the presence of an accelerator comprising a reaction product of an alkali salt of a mercaptoarylthiazole and a compound possessing the structural formula of

where X is a halogen atom, R is a benzyl radical and N is a component of a pyridine ring.

15. The vulcanized rubber product produced by heating rubber and sulfur in the presence of an accelerator comprising a reaction product of a mercaptobenzothiazole and a compound possessing the structural formula of

where X is a halogen atom, R is a benzyl radical and N is a component of a pyridine ring.

16. The vulcanized rubber product produced by heating rubber and sulfur in the presence of an accelerator comprising a reaction product of pyridine chlorobenzylate and a mercaptobenzothiazole.

17. The vulcanized rubber product produced by heating rubber and sulfur in the presence of an accelerator comprising a reaction product of pyridine chlorobenzylate and an alkali salt of a mercaptobenzothiazole.

18. The vulcanized rubber product produced by heating rubber and sulfur in the presence of an accelerator comprising a reaction product of quinoline chlorobenzylate and the sodium salt of mercaptobenzothiazole.

19. The vulcanized rubber product produced by heating rubber and sulfur in the presence of an accelerator comprising a reaction product of substantially equi-molecular proportions of pyridine chlorobenzylate and the sodium salt of mercaptobenzothiazole.

20. The vulcanized rubber product produced by heating rubber and sulfur in the presence of an accelerator comprising a reaction product of substantially equi-molecular proportions of quinoline chlorobenzylate and the sodium salt of mercaptobenzothiazole.

JAMES H. FENTRESS.